(12) United States Patent
Kim et al.

(10) Patent No.: US 9,706,517 B2
(45) Date of Patent: Jul. 11, 2017

(54) POSITION CALCULATION METHOD AND APPARATUS IN WIRELESS COMMUNICATION SYSTEM

(71) Applicant: LG ELECTRONICS INC., Seoul (KR)

(72) Inventors: Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 14/754,313

(22) Filed: Jun. 29, 2015

(65) Prior Publication Data

US 2015/0382318 A1 Dec. 31, 2015

Related U.S. Application Data

(60) Provisional application No. 62/019,410, filed on Jun. 30, 2014.

(51) Int. Cl.
*H04W 64/00* (2009.01)
*G01S 5/00* (2006.01)
*G01S 5/02* (2010.01)

(52) U.S. Cl.
CPC ......... *H04W 64/006* (2013.01); *G01S 5/0054* (2013.01); *G01S 5/0215* (2013.01)

(58) Field of Classification Search
CPC .................................................. H04W 64/006
See application file for complete search history.

(56) References Cited

U.S. PATENT DOCUMENTS

| | | | | |
|---|---|---|---|---|
| 5,974,329 A * | 10/1999 | Wylie | ................... | G01S 5/0215 342/457 |
| 6,377,565 B1 * | 4/2002 | Puckette, IV | ......... | H04J 3/0682 370/337 |
| 8,385,305 B1 * | 2/2013 | Negus | ................. | H04W 76/025 370/310 |
| 2002/0058513 A1 * | 5/2002 | Klein | .................... | H04W 16/02 455/447 |
| 2002/0065089 A1 * | 5/2002 | Soliman | .............. | H04W 56/006 455/502 |
| 2006/0105730 A1 * | 5/2006 | Modonesi | ................ | H01Q 9/06 455/273 |
| 2009/0116419 A1 * | 5/2009 | Chong | ................... | H04B 7/024 370/312 |

(Continued)

*Primary Examiner* — Mazda Sabouri
(74) *Attorney, Agent, or Firm* — Lee Hong Degerman Kang Waimey

(57) ABSTRACT

A method of positioning a mobile station (MS) in a wireless communication system is provided. The method is performed by the MS. The method includes receiving information on a reference signal for positioning from a serving base station, measuring the reference signal, comparing a transmission polarization characteristic and reception polarization characteristic of the measured reference signal and determining whether a light of sight (LOS) link between a base station for transmitting the reference signal and the MS is present or not, when the information on the reference signal includes information on the transmission polarization characteristic of the reference signal, and transmitting information on whether the LOS link is present or not to the serving base station.

14 Claims, 10 Drawing Sheets

(56) References Cited

U.S. PATENT DOCUMENTS

| | | | | |
|---|---|---|---|---|
| 2009/0116422 A1* | 5/2009 | Chong | ............... | H04B 7/15592 370/315 |
| 2012/0162012 A1* | 6/2012 | Marzouki | ................. | G01S 3/72 342/378 |
| 2014/0003654 A1* | 1/2014 | Beaurepaire | ....... | G06K 9/00664 382/103 |
| 2014/0329520 A1* | 11/2014 | Militano | ............... | H04W 24/02 455/422.1 |
| 2015/0181622 A1* | 6/2015 | Li | ....................... | H04W 56/004 370/280 |
| 2016/0124073 A1* | 5/2016 | Kwak | ...................... | G01S 1/08 455/456.1 |

\* cited by examiner

FIG. 6
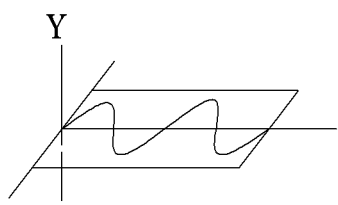
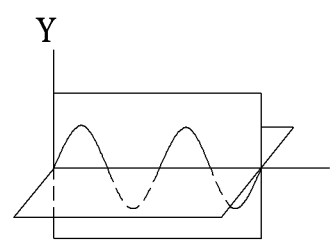
Linearly polarized light

POSITION CALCULATION METHOD AND APPARATUS IN WIRELESS COMMUNICATION SYSTEM

Pursuant to 35 U.S.C. §119(e), this application claims the benefit of U.S. Provisional Patent Application No. 62/019,410, filed on Jun. 30, 2014, the contents of which are hereby incorporated by reference herein in its entirety.

BACKGROUND OF THE INVENTION

Field of the Invention

The present invention relates to a wireless communication system, and more particularly, to a position calculation method and apparatus in a wireless communication system.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, an object of the present invention is to provide a position calculation method in a wireless communication system.

According to the embodiment, provided is a method of positioning a mobile station (MS) in a wireless communication system. The method may be performed by the MS. The method may include receiving information on a reference signal for positioning from a serving base station, measuring the reference signal, comparing a transmission polarization characteristic and reception polarization characteristic of the measured reference signal and determining whether a light of sight (LOS) link between a base station for transmitting the reference signal and the MS is present or not, when the information on the reference signal includes information on the transmission polarization characteristic of the reference signal, and transmitting information on whether the LOS link is present or not to the serving base station.

Additionally or alternatively, the reference signal for positioning may be transmitted from one or more base stations.

Additionally or alternatively, the polarization characteristic to be compared may include a polarization angle, cross-polarization discrimination (XPD) or a polarization rotation direction, and the XPD is a ratio of a reference signal received power in a polarization antenna co-polarized with a polarization antenna used to transmit the reference signal to a reference signal received power in a polarization antenna cross-polarized with the polarization antenna used to transmit the reference signal.

Additionally or alternatively, the method may further chide measuring a propagation time of the LOS link to the serving base station.

Additionally or alternatively, the method may further include cancelling a non-LOS (NLOS) component by passing the received reference signal through a correlator in order to measure the propagation time of the LOS link, and the correlator may match the received reference signal with the transmission polarization characteristic.

Additionally or alternatively, the method may further include transmitting information on received power and reception time of the received reference signal to the serving base station.

Additionally or alternatively, the method may further include receiving information on a second reference signal having the same transmission polarization characteristic as the reference signal; and measuring a reception polarization characteristic of the second reference signal, and the reception polarization characteristic of the second reference signal may be used to determine whether the LOS link is present or not.

According to another embodiment, provided is a method of positioning a mobile station (MS) in a wireless communication system. The method may be performed by a base station, the method may include transmitting, to a serving MS, information on a reference signal for positioning and information indicating whether to report a reception polarization characteristic of the reference signal; receiving information on the reception polarization characteristic of the reference signal from the serving MS; and comparing the reception polarization characteristic and a transmission polarization characteristic of the reference signal and determining whether a light of sight (LOS) between a base station which transmits the reference signal and the MS is present or not, or a possibility that the LOS link is established.

Additionally or alternatively, the reference signal for positioning may be transmitted by one or more BSs.

Additionally or alternatively, the polarization characteristic to be compared may include a polarization angle, cross-polarization discrimination (XPD) or a polarization rotation direction, and the XPD is a ratio of a reference signal received power in a polarization antenna co-polarized with a polarization antenna used to transmit the reference signal to a reference signal received power in a polarization antenna cross-polarized with the polarization antenna used to transmit the reference signal.

According to another embodiment, provided is a mobile station (MS) for positioning in a wireless communication system, and the MS may include a radio frequency (RE) unit; and a processor configured to control the RE unit, the processor may be configured to receive information on a reference signal for positioning from a serving base station, to measure the reference signal, to compare a transmission polarization characteristic and reception polarization characteristic of the measured reference signal to determine whether a light of sight (LOS) link between a base station for transmitting the reference signal and the MS is present or not, when the information on the reference signal includes information on the transmission polarization characteristic of the reference signal, and to transmit information on whether the LOS link is present or not to the serving base station.

Additionally or alternatively, the reference signal for positioning may be transmitted from one or more base stations.

Additionally or alternatively, the polarization characteristic to be compared may include a polarization angle, cross-polarization discrimination (XPD) or a polarization rotation direction, and the XPD is a ratio of a reference signal received power in a polarization antenna co-polarized with a polarization antenna used to transmit the reference signal to a reference signal received power in a polarization antenna cross-polarized with the polarization antenna used to transmit the reference signal.

Additionally or alternatively, the processor may be configured to measure a propagation time of the LOS link to the serving base station.

Additionally or alternatively, the processor may be configured to cancel a non-LOS (NLOS) component by passing the received reference signal through a correlator in order to measure the propagation time of the LOS link, and the correlator may match the received reference signal with the transmission polarization characteristic.

Additionally or alternatively, the processor may be configured to transmit information on received power and reception time of the received reference signal to the serving base station.

Additionally or alternatively, the processor may be configured to receive information on a second reference signal having the same transmission polarization characteristic as the reference signal and to measure a reception polarization characteristic of the second reference signal, the reception polarization characteristic of the second reference signal is used to determine whether the LOS link is present or not.

According to another embodiment, provided is a base station (BS) for positioning a mobile station (MS) in a wireless communication system, the BS may include a radio frequency (RE) unit; and a processor configured to control the RE unit. The processor may be configured to transmit, to a serving MS, information on a reference signal for positioning and information indicating whether to report a reception polarization characteristic of the reference signal, to receive information on the reception polarization characteristic of the reference signal from the serving MS, and to compare the reception polarization characteristic and a transmission polarization characteristic of the reference signal to determine whether a light of sight (LOS) between a base station which transmits the reference signal and the MS is present or not or a possibility that the LOS link is established.

Additionally or alternatively, the reference signal for positioning may be transmitted by one or more BSs.

Additionally or alternatively, the polarization characteristic to be compared may include a polarization angle, cross-polarization discrimination (XPD) or a polarization rotation direction, and the XPD is a ratio of a reference signal received power in a polarization antenna co-polarized with a polarization antenna used to transmit the reference signal to a reference signal received power in a polarization antenna cross-polarized with the polarization antenna used to transmit the reference signal.

It is to be understood that both of the above-described methods for solving the problems are merely exemplary of the invention and various embodiments having the technical features of the invention may be derived and understood by those skilled in the art from the detailed description of the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a diagram showing linear polarization;

DETAILED DESCRIPTION OF THE INVENTION

Figure 1:
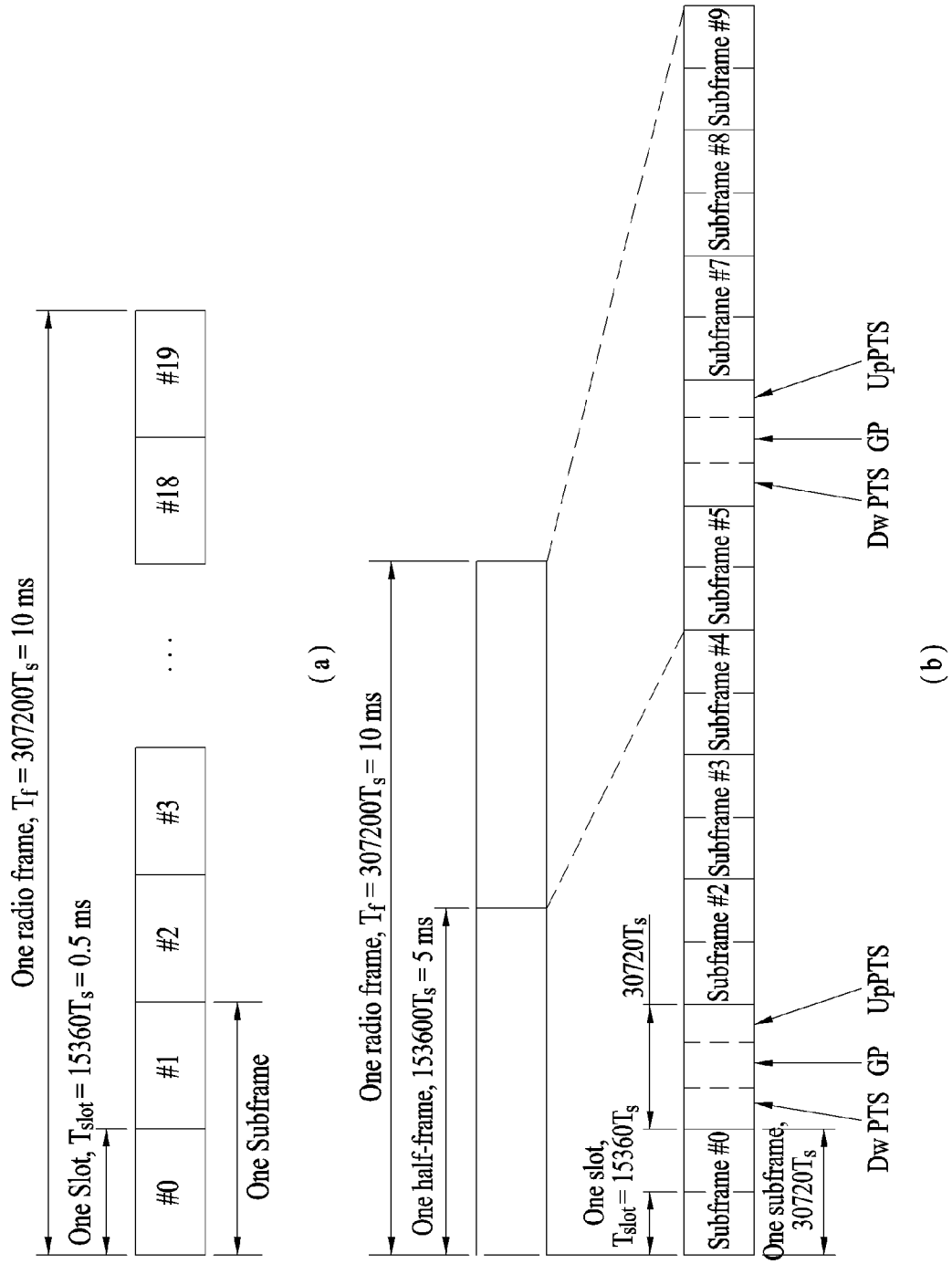
FIG. 1 is a diagram showing an example of the structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
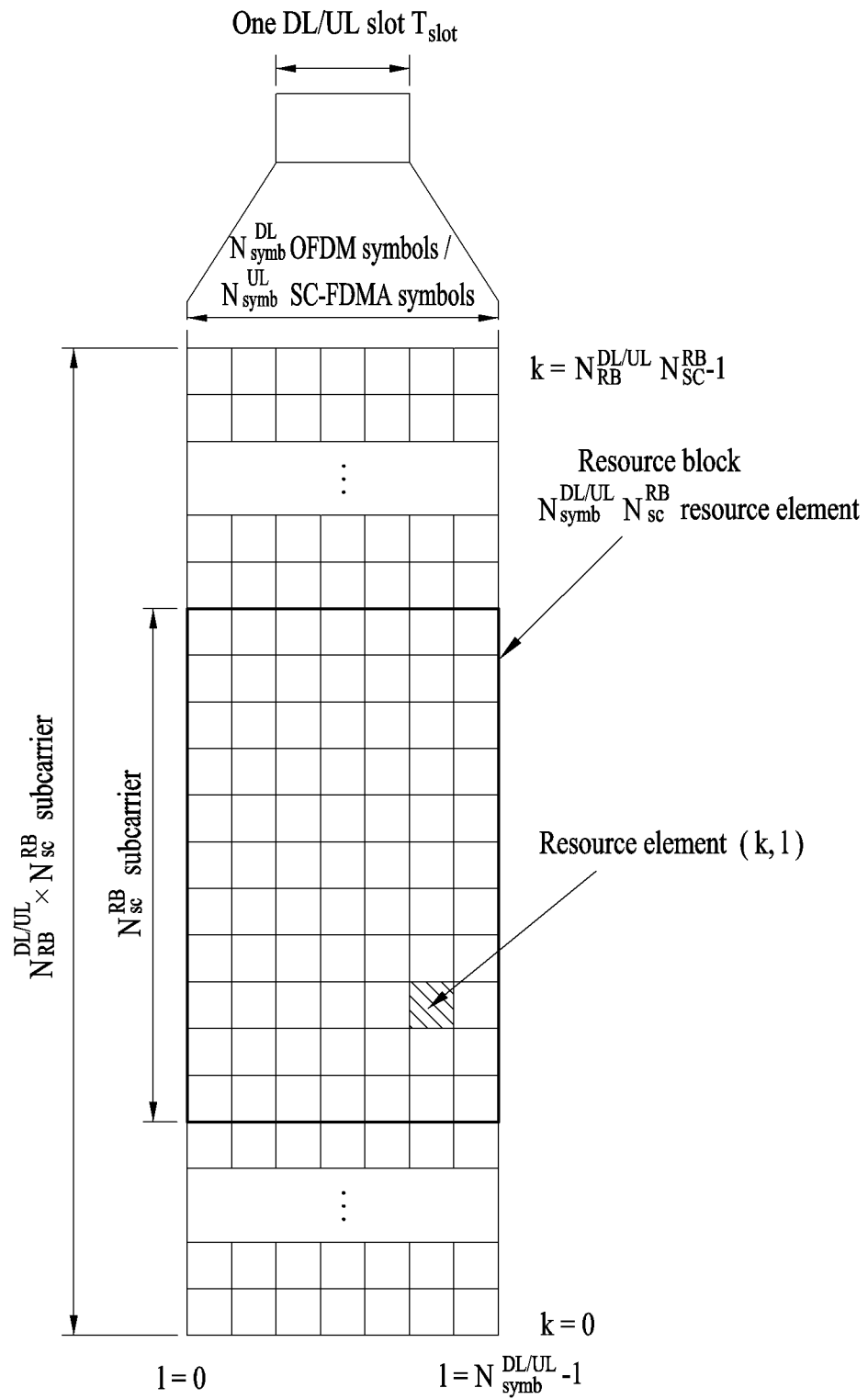
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{Rb}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
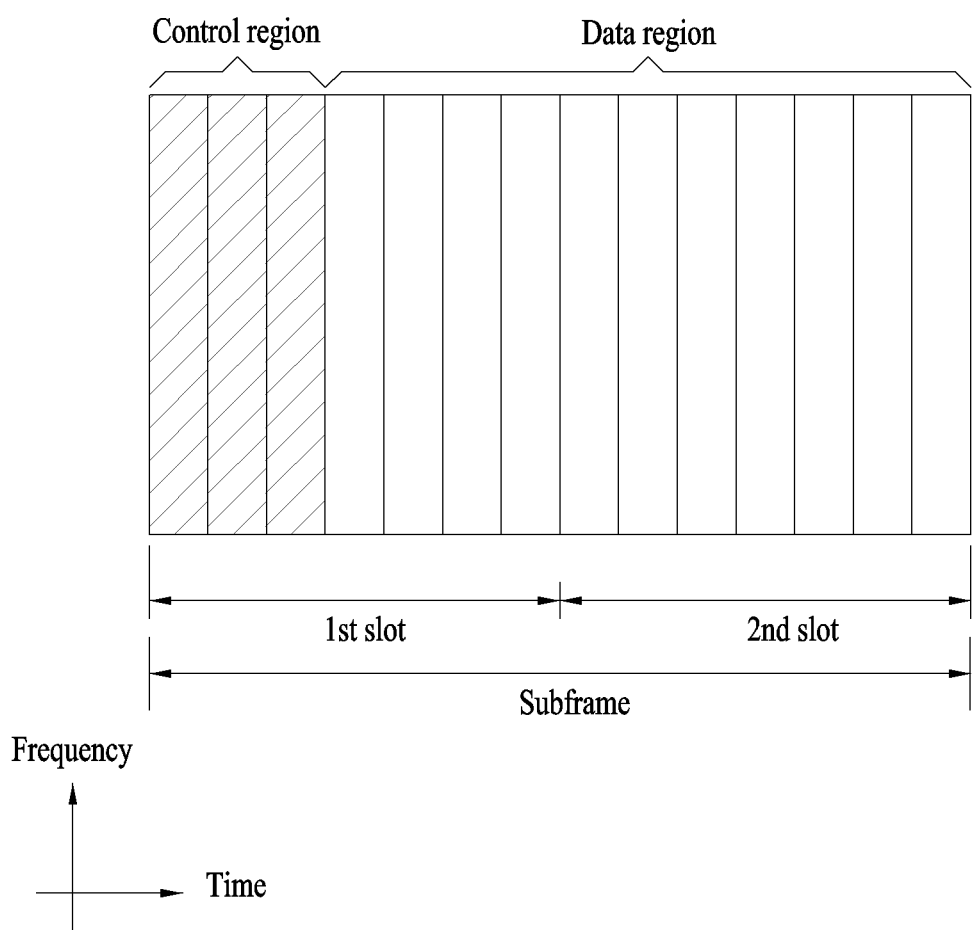
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
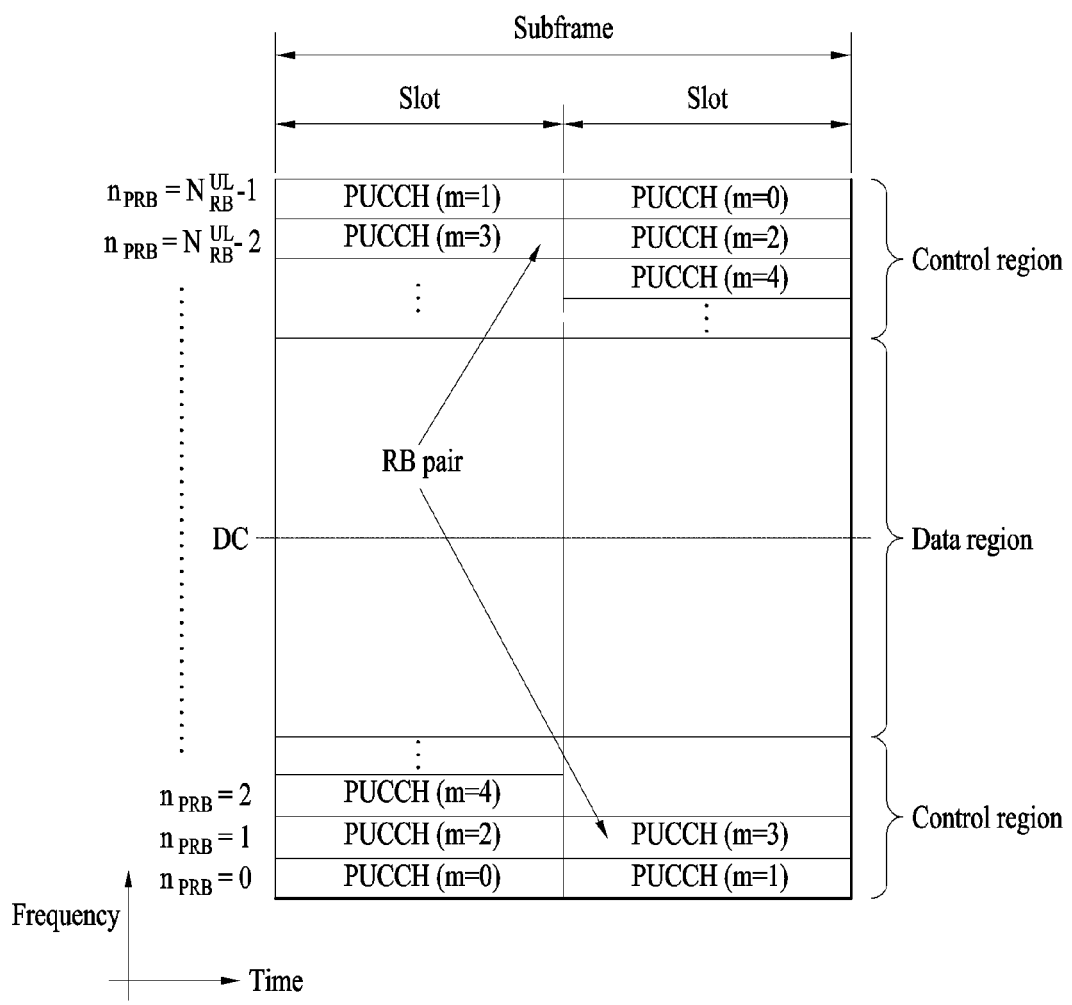
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In the present specification, in order to more accurately calculate the position of an MS, a method of measuring and reporting whether a line of sight (LOS) link between each base station and the MS is present or not is proposed. Alternatively, as information necessary for a position calculation server of a network to determine a possibility that an LOS link is present, polarization characteristic of a received signal (hereinafter, "reception polarization characteristic"), a frequency selective fading degree, etc. is representatively reported.

The term "base station" described in the present invention includes the term "remote radio head (RRH)", "eNB", "transmission point (TP)", "reception point (RP)", "relay", etc. Hereinafter, for convenience of description, proposed methods will be described based on a 3GPP LTE(-A) system. However, the system to which the proposed methods are applied may be extended to other systems (e.g., UTRA, etc.) in addition to the 3GPP LTE(-A) system.

[Positioning]

In general, in a cellular communication system, various methods of acquiring the position information of an MS at a network are used. Representatively, in a 3GPP LTE(-A) system, there is an observed time difference of arrival (OTDOA) based positioning method of, at an MS, receiving positioning reference signal (PRS) transmission related information of base stations (BSs) from a higher layer signal, measuring PRSs transmitted from cells located near the MS, delivering, to a BS or a network, a reference signal time difference (RSTD) which is a difference between the reception time of the PRS transmitted from a reference base station and the reception time of the PRS transmitted from a neighboring base station, and, at the network, calculating the position of the MS using the RSTD and other information. In addition, there are other methods such as an assisted global navigation satellite system (A-GNSS) positioning method, an enhanced cell-ID (E-CID) method, an uplink time difference of arrival (UTDOA) method, etc., which are used for various position-based services (e.g., advertisement, position tracking, emergency communication, etc.).

The above-described conventional positioning methods are already supported by 3GPP UTRA and E-UTRA standard (e.g., LTE Rel-9). However, recently, higher accuracy is required for an in-building positioning method. That is, although the conventional positioning methods are commonly applicable to outdoor and indoor environments, general positioning accuracy of the E-CID method is 150 m in a non-LOS (NLOS) environment and is 50 m in an LOS environment. In addition, even in the OTDOA method based on the PRS, positioning error may exceed 100 m due to eNB synchronization error, multipath propagation error, RSTD measurement quantization error of a UE, timing offset estimation error, etc. In addition, since the A-GNSS method requires a GNSS receiver, there are limits in complexity or battery consumption and restrictions on in-building positioning.

In a method of measuring a propagation time of a transmitted signal and calculating the position of an MS, error due to multipath propagation in an NLOS environment may be very large. Therefore, in the present specification, a method of measuring and reporting whether an LOS link between each base station and an MS is present or not is proposed. Alternatively, as information necessary for a position calculation server of a network to determine a possibility that an LOS link is present, a reception polarization characteristic, a frequency selective fading degree, etc. is representatively reported.

[Polarization Antenna]

Figure 5:
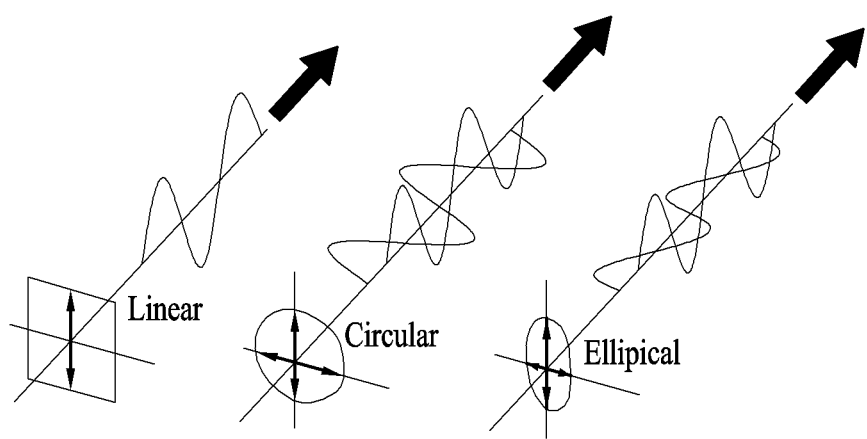
FIG. 5 is a diagram showing a polarization type.

Polarization of an antenna means polarization of an electric field in the direction of travel of the electromagnetic wave on the surface of the earth. As shown in FIG. 5, polarization is largely divided into linear polarization, circular polarization and elliptical polarization.

Linear polarization is divided into horizontal polarization (the upper side of FIG. 6) in which the polarity of the electric field is changed in a horizontal direction of the ground and vertical polarization (the lower side of FIG. 6) in which the polarity of the electric field is changed in a vertical direction of the ground.

Figure 7:
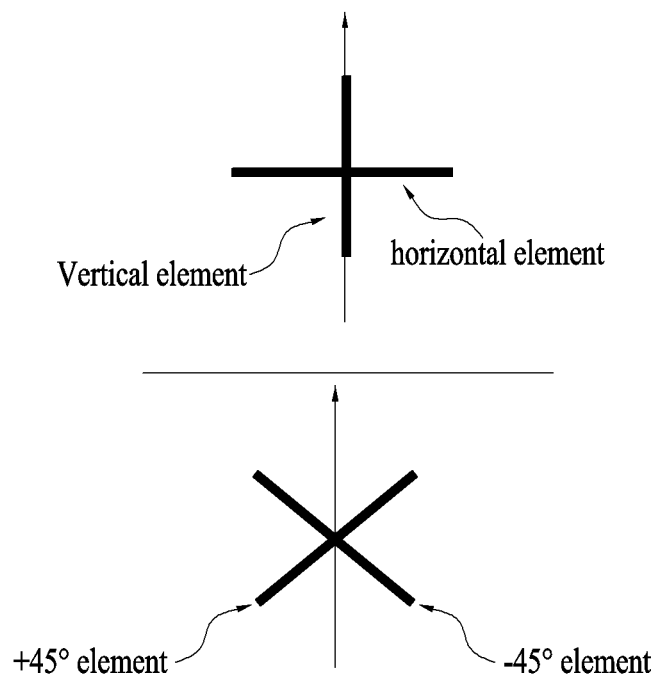
FIG. 7 is a diagram showing the structure of a cross polarization antenna.

As shown in the upper side of FIG. 7, in a cross polarization antenna including a vertical antenna and a horizontal antenna, when the same signal is transmitted via the antennas, a polarization surface is tilted by 45 degrees or −45 degrees. Such polarization characteristics are equal to those of a signal transmitted via a slanted cross polarization antenna having a slanted vertical antenna and a slanted horizontal antenna as shown in the lower side of FIG. 7.

Figure 8:
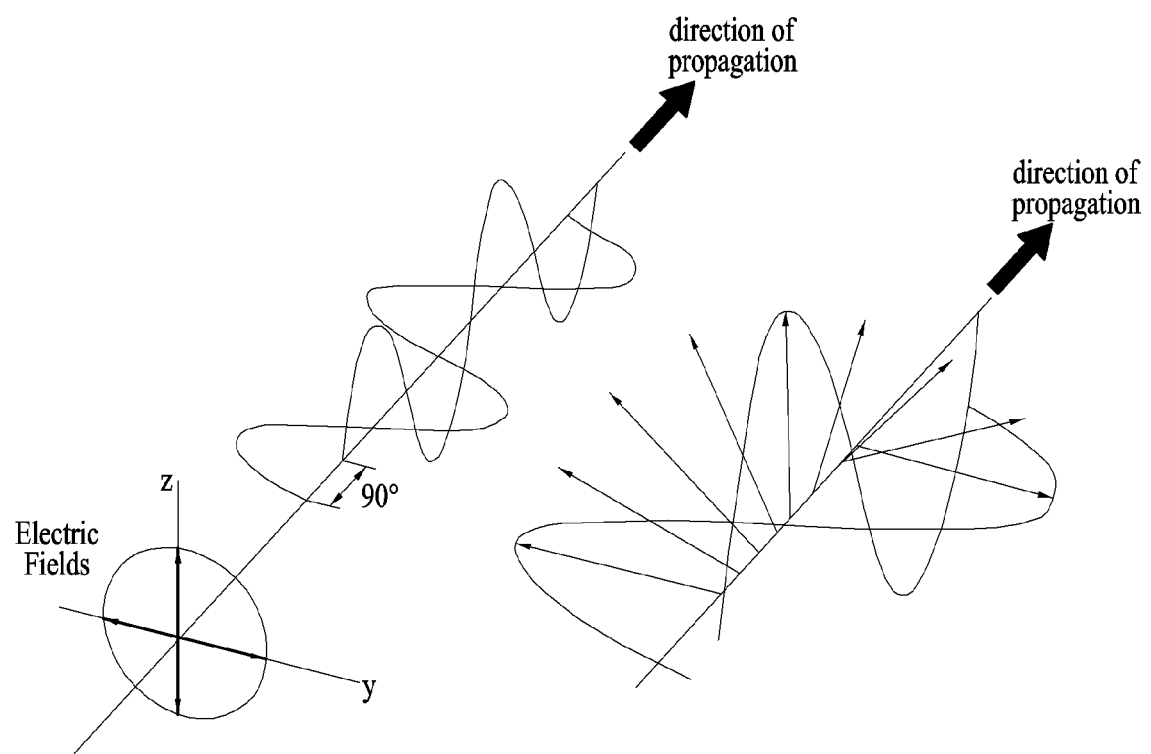
FIG. 8 is a diagram showing circular polarization.

In circular polarization, a plane of polarization is spirally changed with time and according to the wave's direction of travel. A circularly polarized signal may be generated by transmitting the same signal via antennas in a cross polarization antenna including a vertical antenna and a horizontal antenna and applying a phase or time difference to the transmitted signal. As shown in FIG. 8, when a signal transmitted via the vertical antenna is transmitted in a state of being delayed from a signal transmitted via the horizontal antenna by 90 degrees, polarization of a signal generated by combining the two transmitted signals appears to be rotated counterclockwise in a propagation direction and is called right-handed circular polarization. In contrast, when a signal transmitted via the vertical antenna is transmitted in a state of being delayed from a signal transmitted via the horizontal antenna by −90 degrees, polarization of a signal generated by combining the two transmitted signals appears to rotate clockwise in a propagation direction and is called left-handed circular polarization.

When the time or phase delay value of the signal transmitted via the horizontal antenna and the signal transmitted via the vertical antenna is not a multiple of 90 degrees or when the levels of the signals transmitted via the antennas are not equal, the transmitted signals have an elliptical polarization characteristic.

Theoretically, in the cross polarization antenna shown in the upper side of FIG. 7, orthogonality between the signals transmitted via the vertical antenna and the horizontal antenna is ensured not to cause mutual interference. That is, when the cross polarization antenna shown in the upper side of FIG. 7 is mounted in a transmitter and a receiver to perform communication, the signal transmitted via the vertical antenna of the transmitter is only received by the vertical antenna of the receiver and the signal transmitted via the horizontal antenna of the transmitter is only received by the horizontal antenna of the receiver, such that interference between the signals is not caused. However, such a phenomenon occurs only when an LOS link is present. In general, the polarization characteristic of the transmitted signal (hereinafter, "transmission polarization characteristic") is changed when the signal is reflected, refracted or diffracted from a reflector and an obstacle, causing mutual interference between the antennas. As a measurement value indicating such an interference degree, cross polarization discrimination (XPD) is generally used. XPD is defined as a ratio of power received in a polarization antenna co-polarized with a polarization antenna used to transmit the reference signal in the transmitter to power received in a polarization antenna cross-polarized with a polarization antenna used to transmit the reference signal. In addition, the rotation direction of the circularly polarized signal is changed by reflection, refraction or diffraction.

Therefore, the polarization characteristics of the transmitted signal and the received signal, that is, differences in received polarization angle, XPD and polarization rotation direction, may be compared to determine whether reception is performed via an LOS link without reflection, refraction or diffraction. That is, the MS analyzes the characteristic of the signal received by a cross polarization antenna pair including a vertical antenna and a horizontal antenna to check the polarization characteristic of the received signal. Alternatively, the MS receives only the signal having the polarization characteristic of the transmitted signal, cancels signals received via multiple paths having a modified polarization characteristic, that is, NLOS links, and accurately measures the propagation time of the LOS link. Here, the MS adjusts a correlator to match a transmission polarization characteristic and passes received signals through the correlator to cancel the received signals of the NLOS component having different polarization characteristics from all the received signals.

[Frequency Selective Fading Characteristic]

Even when an LOS link is established between the transmission antenna of a base station and an MS, the MS receives some signals via an NLOS link due to reflection, refraction or diffraction. When the LOS link and the NLOS links are mixed, a ratio of signal energy received via the LOS link to signal energy received via the remaining NLOS links is referred to as the Rician factor. When the LOS link and the NLOS links are mixed, there is high probability that the signal is earliest received via the LOS link. Therefore, the MS may set ratios of energy of the signal received earliest to energy of the remaining received signals as Rician factor estimates and determine whether the LOS link is present according to the ratios.

[Multipath Cancellation Reception Method]

In the proposed method, a base station (BS) notifies an MS of transmission polarization characteristic information of a transmitted PRS via higher layer signals and the MS receives only a signal having a transmission polarization characteristic of the PRS, that is, cancels multipath signals via the remaining NLOS links, and accurately measures the propagation time of the LOS link. The transmission polarization characteristic information of the PRS may include one polarization characteristic information equally applied to all BSs. Alternatively, the transmission polarization characteristic information of the PRS may be individually signaled when transmission configuration information of the PRS is signaled according to serving BS, neighboring BS or transmission point.

The MS reports presence/absence of multipath interference cancellation capabilities using polarization characteristic of a received signal in a registration process. The BS notifies the MS having such capabilities of transmission polarization characteristic information of each PRS when notifying the MS of configuration information of the PRS. The MS determines that multipath interference is not easily cancelled using the polarization characteristic, when the configuration information of a specific PRS (or "specific PRS configuration information") does not include the transmission polarization characteristic information and does not use the multipath interference cancellation reception method with respect to the corresponding PRS.

[Method of, at MS, Determining Whether LOS Link is Present or not]

The BS notifies the MS of the transmission polarization characteristic information of the transmit antenna via higher layer signaling and the MS measures the polarization characteristic of the received signal and determines whether an LOS link is established between the BS and the MS using information on a difference in polarization characteristic between the transmitted signal and the received signal. As a representative example, when the BS notifies the MS that a right-handed polarization signal is transmitted, the MS divides the received signal into a right-handed polarization component and a left-handed polarization component, compares the levels and times of arrival of the right-handed polarization component and the left-handed polarization component, and determines a possibility that an LOS link is established. That is, when the signal component having the transmission polarization characteristic arrives with higher strength earlier than the signal components having different polarization characteristics, it is determined that the LOS link is established. The MS reports information indicating whether the LOS link is present or not, which is obtained via such a process, to the BS. The MS may report information on the possibility that an LOS link is established between the BS and the MS in addition to or instead of information on whether the LOS link is present or not. When the MS reports information on the LOS link to the BS, information on whether the LOS link is present or not may be expressed using n bits or information on whether the LOS link is present or not may be expressed using 1 bit of n bits and determination accuracy may be expressed using (n−1) bits.

When the MS is configured to receive and report the PRSs from a plurality of BSs, information on the LOS link between each BS and the MS is reported. In this case, the BS notifies the MS of transmission polarization characteristic information of the PRS transmitted by a neighboring BS along with transmission polarization characteristic information of the PRS transmitted thereby and the MS reports, to the BS, receive power information, reception time information and LOS link information of each of the PRSs received from the plurality of BSs.

When the BS notifies the MS of the transmission polarization characteristic information of the PRS, if the transmission polarization characteristic information of the PRS transmitted by the neighboring BS is equal to the transmission polarization characteristic information of the PRS transmitted by the BS, the information may be omitted. The MS assumes that the transmission polarization characteristic information of the PRS transmitted by the neighboring BS is equal to the transmission polarization characteristic information of the PRS transmitted by the serving BS or the reference BS when the transmission polarization characteristic information of the PRS of the neighboring BS is omitted.

The MS reports presence/absence of capabilities for measuring polarization characteristic of the received signal in a registration process. The BS or the network notifies the MS of the transmission polarization characteristic information in addition to transmission periodicity/resource information which is the PRS information of the BSs and enables the MS to report information on the LOS link between the BS and the MS, in order to accurately acquire the position information based on whether the LOS link is present or not.

The BS may enable/disable the MS to report the information on the LOS link between BSs and the MS per BS. Since the transmission polarization characteristic of a legacy BS or a pico BS is not suitably used for detection of the LOS link, the MS is configured not to measure polarization characteristic of the signal transmitted from the legacy BS or the pico BS.

In addition, the MS may determine whether an LOS link is present or not, based on a frequency selective fading characteristic of a received signal. In this case, the BS may request report of LOS related information from the MS without notifying the MS of the polarization characteristic information.

[Method of, at BS, Determining Whether LOS Link is Present or not]

In this method, an MS directly reports polarization characteristic information of a received signal to a BS and a position management server of the BS or a network receives the information, compares the transmission polarization characteristic information of PRSs of BSs and polarization characteristic information of the received signal of the MS, and determines whether an LOS link is established between the BS and the MS.

The MS reports presence/absence of the measurement capabilities of the polarization characteristic of the received signal in a registration process. The BS notifies the MS of whether to report the polarization characteristic information of the received signal, depending on whether operation for determining whether the LOS link is present or not using the polarization characteristic information is performed.

The BS or the network notifies the MS of whether to report the polarization characteristic information of the received signal while indicating transmission periodicity/resource information which is the PRS information of the BSs, in order to accurately acquire the position information based on whether the LOS link is present or not. The report of the polarization characteristic information of the received signal may be enabled/disabled according to BS or PRS transmission point.

In addition, the BS requests the MS to report the frequency selective fading characteristic such as the Rician factor or the number of multiple paths in order to determine whether the LOS link is present or not.

The MS reports presence/absence of the measurement capabilities of the frequency selective fading characteristic in a registration process. The BS notifies the MS of whether to report the frequency selective fading information of the received signal, depending on whether operation for determining whether the LOS link is present or not using the frequency selective fading characteristic information is performed.

[QCL Between PRS and Another RS]

In order to accurately estimate the polarization characteristics of PRSs transmitted from BSs or transmission points, the number of times of transmission of the PRS is preferably increased, but overall system overhead is increased. Therefore, in the present specification, when the BS notifies the MS of transmission configuration information of the PRS, an RS having the same reception polarization characteristic as the PRS is additionally signaled. This may be referred to as quasi-co-location (QCL) information of a polarization characteristic. The RS may be a cell-specific reference signal (CRS) or a channel state information-reference signal (CSI-RS).

The PRS is intermittently transmitted and is subjected to less interference due to cooperation between BSs. In contrast, the CRS is transmitted on every subframe but is significantly influenced by interference from a neighboring cell. Therefore, the MS finally determines the reception polarization characteristic of the PRS using measurement value of the reception polarization characteristic of signals in a QCL relationship of the polarization characteristic, that is, the CRS and the CSI-RS, and measurement value of the reception polarization characteristic of the PRS.

Such QCL assumption is applicable to delay spread, Doppler spread, Doppler shift and average delay in addition to the polarization characteristic of the received signal. That is, the BS notifies the MS of an RS having the same reception characteristic such as polarization characteristic, delay spread, Doppler spread, Doppler shift or average delay, in addition to the configuration information of the PRS. This RS is QCL with the PRS and may be a CRS or a CSI-RS.

Figure 9:
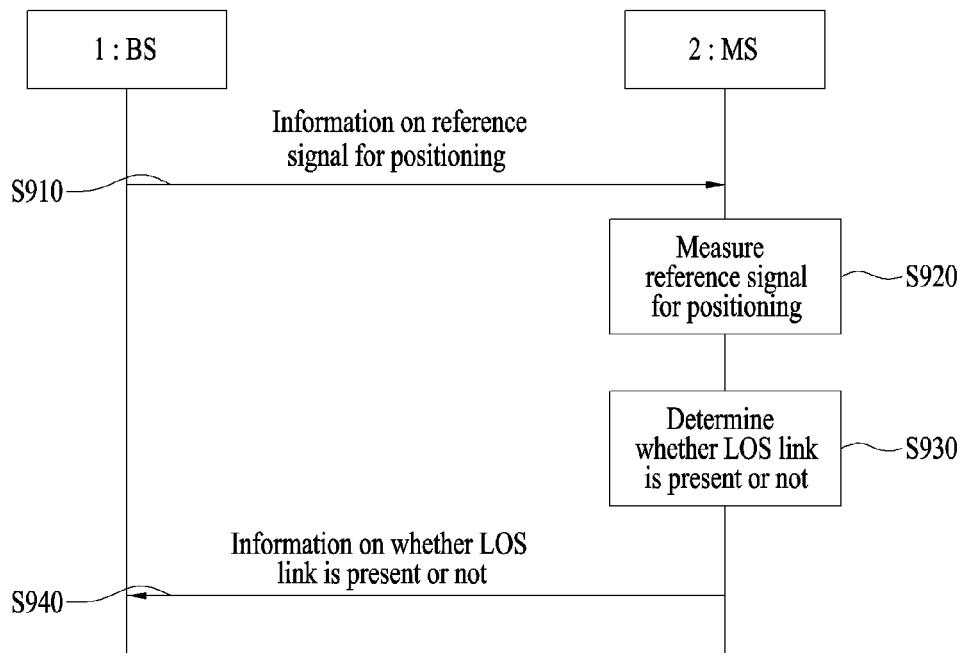
FIG. 9 is a diagram showing operation according to one embodiment of the present invention.

FIG. 9 is a diagram showing operation according to one embodiment of the present invention.

The operation according to one embodiment of the present invention shown in FIG. 9 relates to a method of positioning an MS in a wireless communication system, which may be performed by an MS or a serving BS.

In the embodiment shown in FIG. 9, the MS directly determines and reports, to the BS, whether an LOS link with a BS for transmitting a reference signal for positioning is present or not.

The MS 2 may receive information on the reference signal for positioning from a serving BS 1 (S910). Then, the MS may receive or measure the reference signal (S920). The reference signal may be transmitted from one or more BSs including the serving BS. That is, the reference signal may be transmitted from one or more neighboring BSs.

When information on the reference signal includes information on the transmission polarization characteristic of the reference signal, the MS may compare the transmission polarization characteristic with the reception polarization characteristic of the measured reference signal and determine whether an LOS link between the BS for transmitting the reference signal and the MS is present or not (S930).

Then, the MS may transmit the information on whether the LOS link is present or not to the serving BS (S940).

The polarization characteristic to be compared may include a polarization angle, cross-polarization discrimination (XPD) or a polarization rotation direction. XPD may be a ratio of power of a reference signal received via a co-polarization antenna with a transmitted polarization antenna used to transmit the reference signal to power of a reference signal received via a cross-polarization antenna.

In addition, the MS may transmit the propagation time of the LOS link to the serving BS. In order to measure the propagation time of the LOS link, the MS may pass the received reference signal through a correlator to cancel a non-LOS (NLOS) component. The correlator matches the received reference signal with the transmission polarization characteristic.

In addition, the MS may transmit receive power information and reception time information of the measured reference signal to the serving BS.

In addition, the MS may receive information on a second reference signal having the same transmission polarization characteristic of the reference signal or having a specific relationship (e.g., QCL relationship) with the reference signal and measure the reception polarization characteristic of the second reference signal. The reception polarization characteristic of the second reference signal may be used to determine whether the LOS link is present or not.

Although the embodiment of the present invention has briefly been described with reference to FIG. 9, the embodiment of FIG. 9 may alternatively or additionally include at least one of the above-described embodiment(s).

Figure 10:
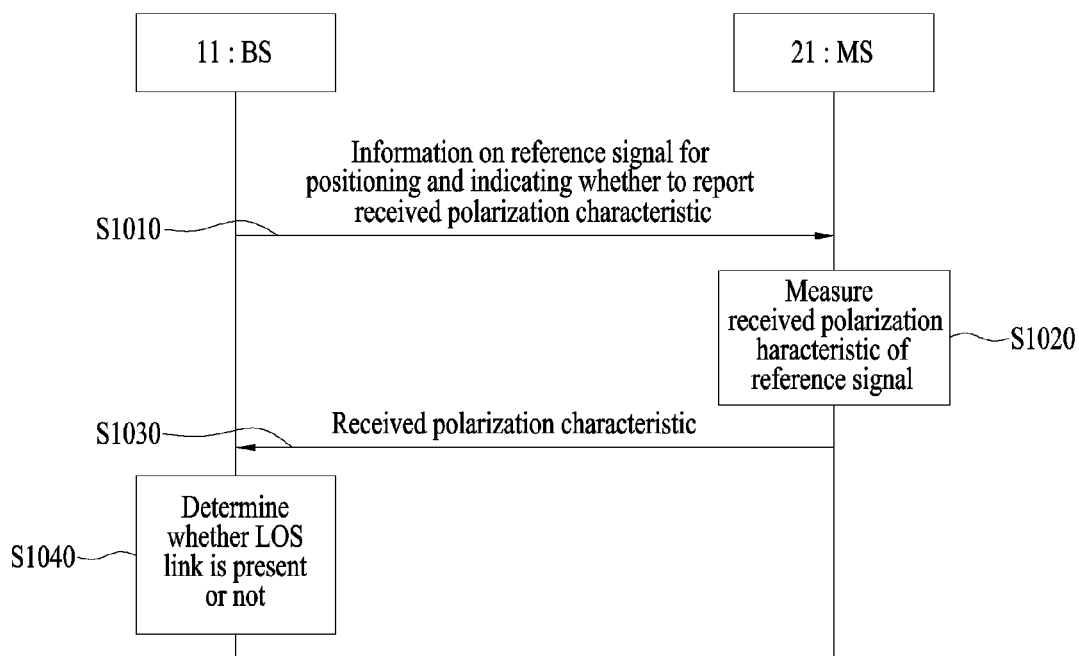
FIG. 10 is a diagram showing operation according to one embodiment of the present invention.

FIG. 10 is a diagram showing operation according to one embodiment of the present invention.

The operation according to one embodiment of the present invention shown in FIG. 10 relates to a method of positioning an MS in a wireless communication system, which may be performed by a serving BS or a location server.

In the embodiment shown in FIG. 10, the BS or the location server receives the polarization characteristic of a reference signal for positioning measured by the MS from the MS and determines whether an LOS link with a BS for transmitting the reference signal is present or not using the reception polarization characteristic.

The BS 11 may transmit, to the serving MS 21, information on the reference signal for positioning and information indicating whether to report the reception polarization characteristic of the reference signal (S1010). The MS may measure the reception polarization characteristic of the received reference signal (S1020), when receiving the information indicating the report of the reception polarization characteristic.

The BS may receive the information on the reception polarization characteristic of the reference signal from the MS (S1030).

Then, the BS may compare the reception polarization characteristic and the transmission polarization characteristic of the reference signal and determine whether an LOS link between the BS for transmitting the reference signal and the MS is present or not or a possibility that the LOS link is established.

The reference signal may be transmitted from one or more BSs including the serving BS. That is, the reference signal may be transmitted from one or more neighboring BSs.

The polarization characteristic to be compared may include a polarization angle, cross-polarization discrimination (XPD) or a polarization rotation direction. XPD may be a ratio of power of a reference signal received via a co-polarization antenna with a transmitted polarization antenna used to transmit the reference signal to power of a reference signal received via a cross-polarization antenna.

Although the embodiment of the present invention has briefly been described with reference to FIG. 10, the embodiment of FIG. 10 may alternatively or additionally include at least one of the above-described embodiment(s).

Figure 11:
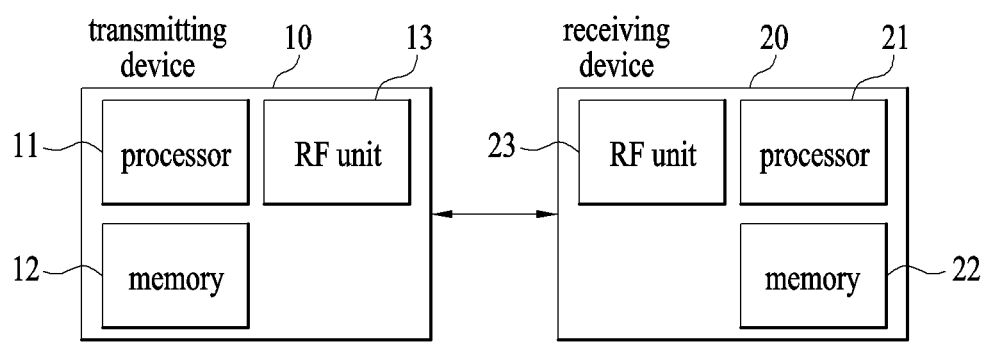
FIG. 11 is a block diagram showing an apparatus for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application have been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A method of positioning a mobile station (MS) in a wireless communication system, the method being performed by the MS, the method comprising:
receiving information on a reference signal for positioning from a serving base station;
measuring the reference signal;
comparing a transmission polarization characteristic and reception polarization characteristic of the measured reference signal and determining whether a light of sight (LOS) link between a base station for transmitting the reference signal and the MS is present or not, when the information on the reference signal includes information on the transmission polarization characteristic of the reference signal; and
transmitting information on whether the LOS link is present or not to the serving base station.
2. The method according to claim 1, wherein the reference signal for positioning is transmitted from one or more base stations.

3. The method according to claim 1, wherein:
the polarization characteristic to be compared includes a polarization angle, cross-polarization discrimination (XPD) or a polarization rotation direction, and
the XPD is a ratio of a reference signal received power in a polarization antenna co-polarized with a polarization antenna used to transmit the reference signal to a reference signal received power in a polarization antenna cross-polarized with the polarization antenna used to transmit the reference signal.
4. The method according to claim 1, further comprising measuring a propagation time of the LOS link to the serving base station.
5. The method according to claim 4, further comprising cancelling a non-LOS (NLOS) component by passing the received reference signal through a correlator in order to measure the propagation time of the LOS link,
wherein the correlator matches the received reference signal with the transmission polarization characteristic.
6. The method according to claim 1, further comprising transmitting information on received power and reception time of the received reference signal to the serving base station.
7. The method according to claim 1, further comprising:
receiving information on a second reference signal having the same transmission polarization characteristic as the reference signal; and
measuring a reception polarization characteristic of the second reference signal,
wherein the reception polarization characteristic of the second reference signal is used to determine whether the LOS link is present or not.
8. A mobile station (MS) for positioning in a wireless communication system, the MS comprising:
a radio frequency (RF) unit; and
a processor configured to control the RF unit,
wherein the processor is configured to receive information on a reference signal for positioning from a serving base station, to measure the reference signal, to compare a transmission polarization characteristic and reception polarization characteristic of the measured reference signal to determine whether a light of sight (LOS) link between a base station for transmitting the reference signal and the MS is present or not, when the information on the reference signal includes information on the transmission polarization characteristic of the reference signal, and to transmit information on whether the LOS link is present or not to the serving base station.
9. The MS according to claim 8, wherein the reference signal for positioning is transmitted from one or more base stations.
10. The MS according to claim 8, wherein:
the polarization characteristic to be compared includes a polarization angle, cross-polarization discrimination (XPD) or a polarization rotation direction, and
the XPD is a ratio of a reference signal received power in a polarization antenna co-polarized with a polarization antenna used to transmit the reference signal to a reference signal received power in a polarization antenna cross-polarized with the polarization antenna used to transmit the reference signal.
11. The MS according to claim 8, wherein the processor is configured to measure a propagation time of the LOS link to the serving base station.

12. The MS according to claim 11, wherein:
the processor is configured to cancel a non-LOS (NLOS) component by passing the received reference signal through a correlator in order to measure the propagation time of the LOS link, and
wherein the correlator matches the received reference signal with the transmission polarization characteristic.

13. The MS according to claim 8, wherein the processor is configured to transmit information on received power and reception time of the received reference signal to the serving base station.

14. The MS according to claim 8, wherein the processor is configured to receive information on a second reference signal having the same transmission polarization characteristic as the reference signal and to measure a reception polarization characteristic of the second reference signal, the reception polarization characteristic of the second reference signal is used to determine whether the LOS link is present or not.

\* \* \* \* \*